United States Patent [19]

Becker

[11] Patent Number: 4,872,997
[45] Date of Patent: Oct. 10, 1989

[54] COOLANT RECYCLING SYSTEM AND METHOD

[75] Inventor: Roger T. Becker, Kalamazoo, Mich.

[73] Assignee: Monlan, Incorporated, Kalamazoo, Mich.

[21] Appl. No.: 231,824

[22] Filed: Aug. 12, 1988

[51] Int. Cl.$^4$ .......................................... B01D 17/035
[52] U.S. Cl. ................................. 210/703; 210/706; 210/202; 210/221.2; 210/241; 210/261; 261/124
[58] Field of Search ............... 210/703, 738, 800, 804, 210/202, 220, 221.2, 241, 255, 258, 261, 262, 295, 322, 513, 704, 705, 706, 221.1; 209/170; 261/124

[56] References Cited

U.S. PATENT DOCUMENTS

| | | |
|---|---|---|
| 665,841 | 1/1901 | Winkel ............................... 210/202 |
| 2,499,705 | 3/1950 | Vokes ................................ 210/241 |
| 2,578,040 | 12/1951 | Booth et al. ....................... 210/703 |
| 3,232,866 | 2/1966 | Morgan .............................. 210/220 |
| 3,396,950 | 8/1968 | Wood ................................. 261/124 |
| 4,269,797 | 5/1981 | Mikiya et al. ..................... 261/124 |
| 4,492,636 | 1/1985 | Burke ................................ 210/706 |
| 4,625,715 | 12/1986 | Bucher .............................. 261/124 |
| 4,737,272 | 4/1988 | Szatkowski et al. .............. 210/703 |
| 4,772,402 | 9/1988 | Love ................................. 210/241 |

FOREIGN PATENT DOCUMENTS 341400 8/1904 France .

Primary Examiner—Peter Hruskoci
Assistant Examiner—Christopher Upton
Attorney, Agent, or Firm—Flynn, Thiel, Boutell & Tanis

[57] ABSTRACT

In the improved system and method of the present invention, a batch of contaminated oil is deposited into a tank, with the oil preferably being passed through a filter during the depositing step to assist in removal of solids. Once the contaminated coolant has been deposited into the tank, the oil is agitated by injecting several streams of air into the bottom of the tank. This creates several bubble streams which pass upwardly through the coolant toward the surface and, during this passage, agitate the coolant and effect separation of the oil so that it rapidly rises to the coolant surface. The bubble streams are created by different sized orifice member whereby the bubbles of one stream are smaller than the bubbles in another stream. This causes differential agitation vertically through the mass of coolant, and also at the surface, whereby the tramp oil which rises to the surface tends to congregate within the small area disposed over the small bubble stream, thereby facilitating removal of the separated oil.

18 Claims, 4 Drawing Sheets

COOLANT RECYCLING SYSTEM AND METHOD

FIELD OF THE INVENTION

This invention relates to an improved system and method for recycling coolant, particularly for effecting removal of tramp oil.

BACKGROUND OF THE INVENTION

The conventional water-soluble coolant used in association with machine tools is relatively costly, and an attempt is made to reuse same not only to reduce the overall cost of purchasing such coolant, but also to avoid the disposal problem associated with contaminated coolant. During use, the coolant becomes contaminated not only with solid contaminants, such as machine chips and the like, but also due to its contact with typical oils such as hydraulic fluids used in association with machines, such oils being referred to as "tramp oil".

At the present time, various cleaning processes and apparatus have been proposed for removing solid contaminants, but such apparatus are normally rather large, complex and costly, and as such are typically suited only for use in situations involving large quantities or batches of contaminated coolant. Further, these known apparatus are normally designed for use in situations where solids are the significant contaminants which are to be removed. However, such apparatus are not suitable for use in all applications since, in many manufacturing operations, the contamination of coolant with tramp oil is a more significant problem.

When significant quantities of tramp oil collect and contaminate the coolant, such oil can effect the desirable properties of the coolant during use. Further, such tramp oil tends to become rancid so that further use of the coolant is highly unsatisfactory.

Thus, it is an object of this invention to provide an improved system and method for effecting removal of oil from coolant to permit reuse of the coolant, which improved system and method is particularly desirable for use with batches of contaminated coolant, and is highly effective in providing an operation which is advantageous in comparison to prior apparatus.

In the improved system and method of the present invention, a batch of contaminated coolant is deposited into a tank, with the coolant preferably being passed through a filter during the depositing step so as to effect removal of solids. Once the contaminated coolant has been deposited into the tank, the coolant is bubbled by injecting several streams of air into the bottom of the tank. This creates bubble streams which pass upwardly through the coolant toward the surface and, during this passage, effect separation of the oil so that it rapidly rises to the coolant surface. At least one of the bubble streams is created by a nozzle or orifice member which differs from other orifice members so that the bubbles of this one stream are smaller than the bubbles in other streams. This causes agitation vertically through the mass of coolant, but also differential agitation at the surface, whereby the tramp oil which rapidly rises to the surface tends to congregate within a small surface area disposed directly over the small bubble stream, thereby facilitating removal of the separated oil.

Other objects and purposes of the invention will be apparent to persons familiar with this industry upon reading the following specification and inspecting the accompanying drawings.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the system and designated parts thereof. Said terminology will includes the words specifically mentioned, derivatives thereof, and words of similar import.

DETAILED DESCRIPTION

Figure 1:
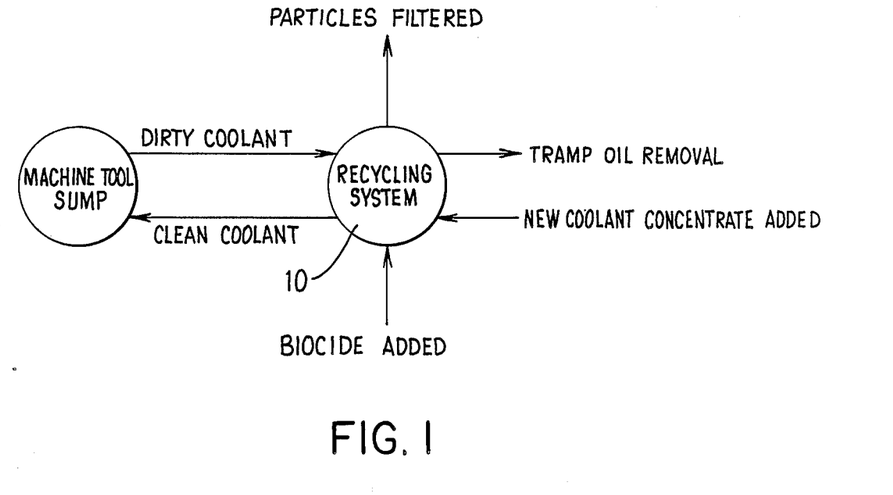
FIG. 1 is a flow chart illustrating the basic method and system of the present invention.

Referring to FIG. 1, the coolant utilized in a machining operation collects within the sump of the machine tool. This dirty coolant, being a batch of predetermined volume as controlled by the size of the machine tool, is transferred to the recycling system 10 of the present invention. Within this recycling system, the coolant is initially filtered so that solid particles of minimum size of about 10 microns are removed. The dirty coolant is then treated within the recycling system to effect removal of the tramp oil. While still located within the tank of the recycling system, new coolant concentrate and biocide can be added if necessary. The batch of recycled clean coolant is then returned to the machine tool.

Considering now the improved recycling system 10 of the present invention, and referring to FIGS. 2-5, this system includes a base or frame 11 which is preferably supported on wheels or castors 12 to define a mobile cart. A recycling tank 13 is stationarily mounted on and projects upwardly from the frame 11. This tank has an open top 14 for communication with a recycling chamber 15 disposed in the interior thereof. The tank 13 has a conventional cylindrical sidewall 16 joined to and projecting upwardly from a bottom wall 17, the latter preferably being of an inverted conical configuration.

Figure 2:
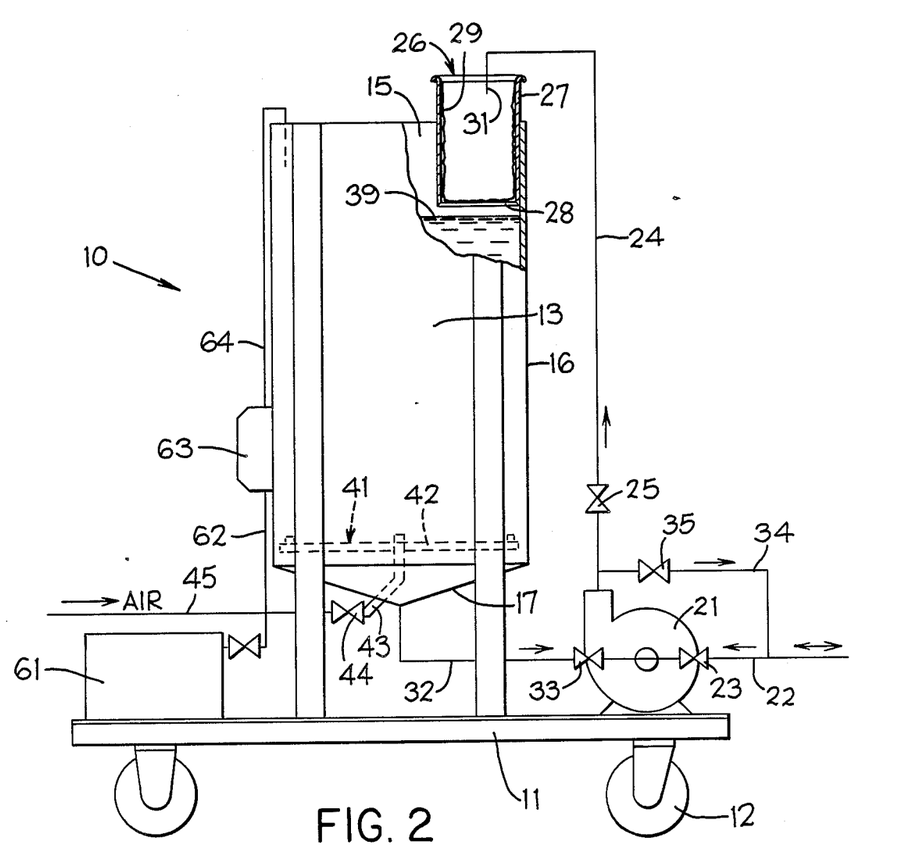
FIG. 2 is a side elevational view, partially broken away, of the inventive system.
Figure 3:
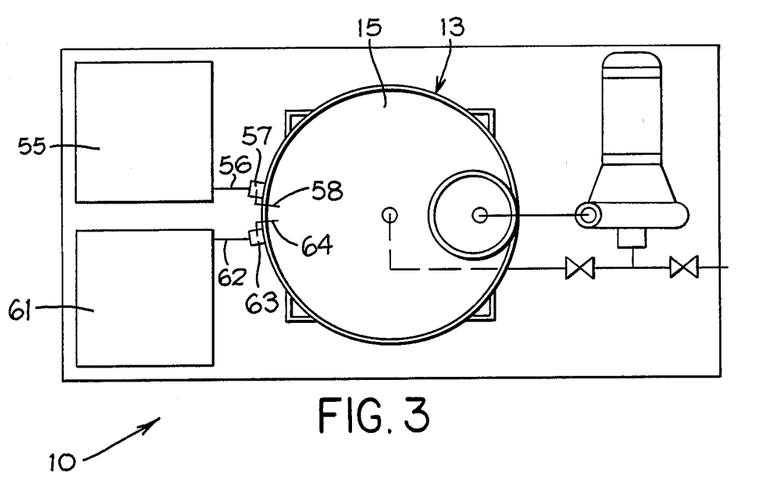
FIG. 3 is a plan view of system shown in FIG. 2.

A conventional fluid pump 21 is mounted on the frame 11 for permitting coolant to be supplied to or discharged from the recycling tank 13. A supply line 22 connects to the pump inlet and has a conventional valve 23 associated therewith for permitting coolant to be withdrawn from the machine tool sump and supplied to the pump. This dirty coolant, as discharged from the pump 21, flows into a discharge line 24 having a conventional valve 25 associated therewith for supplying the coolant into the recycling chamber 15.

Figure 4:
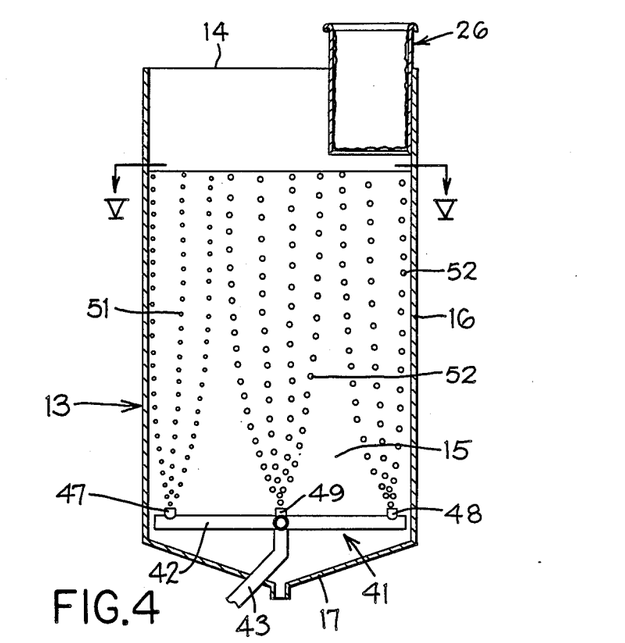
FIG. 4 is a central sectional view through the tank, as taken substantially along line IV—IV in FIG. 5.

The recycling chamber 15, in the vicinity open top 14 thereof, is provided with a filtering arrangement 26 to remove solid contaminants from the dirty coolant prior to deposit of the dirty coolant into the chamber 15. This filter arrangement includes a substantially tubular support wall 27 which is fixed relative to the tank 13 in the vicinity of the top of the tank, and this filter support wall 27 has a bottom wall 28 which is of a grid-like or aperatured structure. A suitable and preferably disposable filter element, such as a filter bag 29, is supported within the wall 27 and effectively rests against the bottom wall 28. The discharge end 31 of the discharge line 24 opens directly into this filter arrangement 26 so that the dirty coolant is deposited and momentarily collects therein. The coolant flows downwardly by gravity through the filter bag 29 so as to collect in the chamber 15. The filter bag is selected so as to have properties required to remove undesired solids, and typically the filter bag is selected to remove solids having a minimum size of about 10 microns. Such filters are conventional.

A withdrawal line 32 connects to the bottom of the tank, preferably at the apex of the bottom wall, for permitting removal of clean coolant. This withdrawal line 32 has a conventional valve 33 associated therewith, and also connects to the inlet of the pump 21. The pump 21 can be used for withdrawing the clean coolant from the recycling chamber, with the clean coolant as discharged from the pump then flowing through a return line 34 back to the machine sump. This return line 34 also has a conventional valve 35 associated therewith.

The dirty coolant supplied to the chamber 15 constitutes a batch having a determined volume, which batch is entirely deposited into the chamber 15 to permit a recycling operation to be carried out. The batch of coolant within the chamber 15 is selected so that the surface level 39 of the coolant is preferably disposed at least a small distance below the bottom wall of the filter arrangement 26.

To assist and greatly accelerate the natural gravity-urged separation of the oil and coolant with the chamber 15, the recycling tank 13 has a bubbling means 41 associated therewith which bubbles the coolant to hence accelerate the separation of the oil and the flow of oil to the surface 39. This bubbling means 41 includes an air manifold 42 disposed adjacent the bottom of the tank 13 and connected to a supply pipe 43 which projects outwardly of the tank. This supply pipe 43 terminates in a suitable valve fitting 44 which is adapted to have a conventional pressurized air-supply conduit 45 releasably connected thereto.

Figure 5:
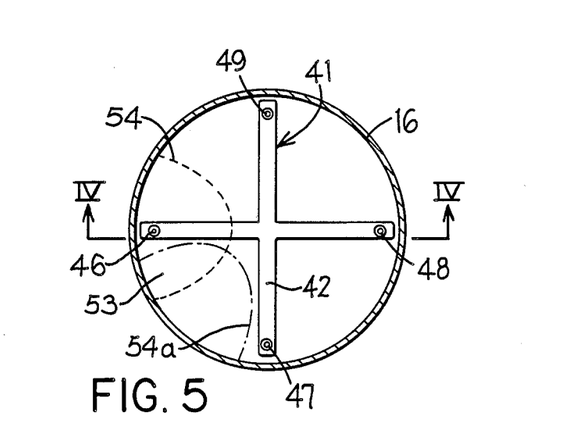
FIG. 5 is a sectional view through the tank as taken substantially along line V—V in FIG. 4.

The manifold 42 has a plurality of nozzles, specifically four nozzles 46-69 in this illustrated embodiment, mounted thereon in spaced relationship around the bottom of the tank so as to eject air upwardly through the chamber 15. These nozzles 46-49 are preferably disposed in a circular pattern, with the individual nozzles being spaced radially inwardly a small distance from the tank sidewall, and with the nozzles themselves being substantially uniformly angularly spaced about the central vertical axis of the tank. The bubbling means 41 may include a single nozzle 46 having a small orifice or orifices associated therewith for ejecting therefrom an upwardly directed airstream. At the same time, the remaining nozzles 47, 48 and 49 each have an orifice or orifices of larger size than that of the nozzle 46. These nozzles 47-49 also eject therefrom upwardly directed airstreams.

As the airstream is ejected from the nozzle 46 directly into the liquid (i.e., the dirty coolant), the airstream is immediately broken up into a stream of small air bubbles 51 which rise upwardly through the coolant to the surface 39 thereof. Similarly, the stream of air ejected from each of the nozzles 47-49 is also immediately broken up into a stream of air bubbles 52 which flow upwardly through the coolant to the surface 39. However, due to the larger orifices associated with the nozzles 47-49, the bubbles 52 created from the airstreams ejected by the nozzles 47-49 are of substantially larger size than the bubbles 51. As the bubble streams 51-52 flow upwardly toward the surface 39, the bubble streams tend to horizontally disperse until the bubble streams effectively contact or overlap one another, thereby effecting agitation of substantially the entire cross section of coolant contained within the chamber, substantially as diagrammatically illustrated in FIG. 4.

The discharge of the bubbles 51,52 into the bottom of the tank 13, followed by the dispersion and upward flow of the bubble streams, hence greatly assists and accelerates the separation of the oil particles from the coolant so that the oil particles flow upwardly and collect on the surface 39. While the exact reason for this accelerated separation and collection of oil on the surface 39 is not totally understood, nevertheless the air bubbles obviously do effect an agitation of the coolant which thus assists in dislodging or moving the oil particles to effect separation thereof from the coolant. This agitation, coupled with the dominant upward flow of the air bubbles through the coolant, is obviously sufficient to greatly accelerate the upward flow of the oil particles. Further, it is believed that the oil particles have a tendency to naturally adhere to the air bubbles themselves, and thus be rapidly carried upwardly to the surface 39.

It has been observed that, due to the different sizes of the bubbles within the bubble streams, the tramp oil particles which rise to the surface 39 tend to effectively collect within a small region or area of the surface as located generally directly above the small bubble stream. That is, most of the oil which rises to the surface 39 tends to collect within a small oil collection area 53 (that is, the area within the dotted line 54 in FIG. 5) disposed substantially directly above the nozzle 46, whereas the remaining area of the coolant surface 39 as disposed above the other nozzles does not tend to collect the oil particles thereon. While the exact reason for this is not known, nevertheless this is presumably due to the greater agitation of the coolant as caused by the larger bubble streams 52. However, due to this concentration within the collection area 53, this greatly facilitates removal of the oil from the coolant, and permits removal of a higher percentage of the oil so as to permit more efficient cleaning of the coolant.

To facilitate handling of the tramp oil which is removed from the coolant, the system 10 preferably includes an oil collection tank 55 mounted on the frame 11. The oil which collects within the area 53 can be removed in any suitable manner and temporarily stored within the tank 55. The removal can be accomplished either by skimming the oil from the area 53 using a skimming tool, or by removing the oil by use of some type of disposable oil-absorbent material (such as oil-absorbent toweling).

In the illustrated embodiment, the oil collection tank 55 has a conduit 56 extending therefrom to a pump 57, the latter being any conventional manually-actuated suction-type pump. This pump 57 connects to a further conduit 58, the latter extending upwardly and into the top of the tank so that the inlet end of conduit 58 can be disposed directly into the oil within the collection area 53 to effectively skim the oil from the coolant.

The system 10 also has a coolant concentrate tank 61 mounted on the frame 11. A conduit 62 extends from this tank 61 to a further manually-actuatable pump 63, and the latter discharges into a further conduit 64 which has its discharge end locatable in the top of the chamber 15 for discharging coolant concentrate therein, if necessary. The coolant concentrate is added after the coolant has been cleaned, but prior to return of the coolant to the machine tool sump.

While there is illustrated separate conduits and pumps for attachment to the oil collection tank 55 and coolant concentrate tank 61, it will be appreciated that a single pump and a single set of conduits can be provided for this purpose. For example, one conduit can be provided for connection between the pump and either of the tanks, and the other conduit connected from the pump to the interior of the recycling chamber. Of course, the connection of the conduits to the inlet and outlet of the pump would have to be reversed depending upon which tank 55 or 61 is being utilized. The conduits preferably comprise small-diameter flexible hoses to facilitate their manual manipulation.

The nozzles 46–49 are preferably formed as a sintered porous metal filter (such as manufactured by Allied Witan Company) or of porous plastics (such as sold by Porex Technologies Corp.). Such porous nozzles are desirable since the porosity of such members provides numerous airstreams which increase the number of bubble streams which are discharged into the coolant and thus increase the accompanying oil separation. However, other nozzle designs and materials are also capable of performing in the desired manner explained above.

In operation, the system 10 can be wheeled to a location close to a machine tool so that the pump 21 can be disposed in fluid communication with the machine tool sump. The valves 23 and 25 are opened so that the pump can supply the batch of dirty coolant into the filter arrangement 26, and thence by gravity downward into the chamber 15. These valves are then closed and, after an air pressure line 45 has been connected to the fitting 44, pressurized air is supplied to the manifold 42 to create the bubble streams 51 and 52. After a selected period of time during which a high percentage of the tramp oil within the dirty coolant rises to the surface 39 and collects within the area 53, this tramp oil is removed, such as by being transferred into the tank 55. The air pressure is then shut off and, if necessary, coolant concentrate and biocide is added to the clean coolant which now remains in the chamber 15. The valves 33 and 35 are then opened so that the pump can withdraw the clean coolant from the chamber 15 and resupply it to the machine tool sump.

Upon completion of the cleaning operation as explained above, the system 10 can be readily moved to a new location so as to permit performance of a further recycling operation. This operation, as explained above, can hence be easily and efficiently performed without requiring collecting and transporting of the dirty coolant through long distances, and can be accomplished by a single operation requiring performance of only minimal manual manipulations and control functions. In fact, after the initial setup and start, the operator can basically leave the system unattended during the separation phase and go about other tasks.

As a variation of the arrangement illustrated in FIG. 5, the adjacent nozzles 46–47 can be identical and of small orifice size so as to emit small bubble streams, whereas the other two nozzles 48–49 can be of larger size to emit larger bubble streams. With such arrangement, the oil which rises to the surface 39 will still tend to collect within a small area although, in this instance, the small area will more closely resemble the area disposed between the nozzles 46–47 as defined within the dash-dot line 54a. When the bubbling arrangement utilizes more than one small-size nozzle such as in the latter-explained variation, it has been observed that the oil still tends to collect within a very small part of the surface area since the larger bubble streams tend to dominate the mass of coolant, both as the bubble streams rise vertically through the coolant and as they agitate the surface, thereby effecting the desired concentration of the oil within a small area of the coolant surface.

Figure 6:
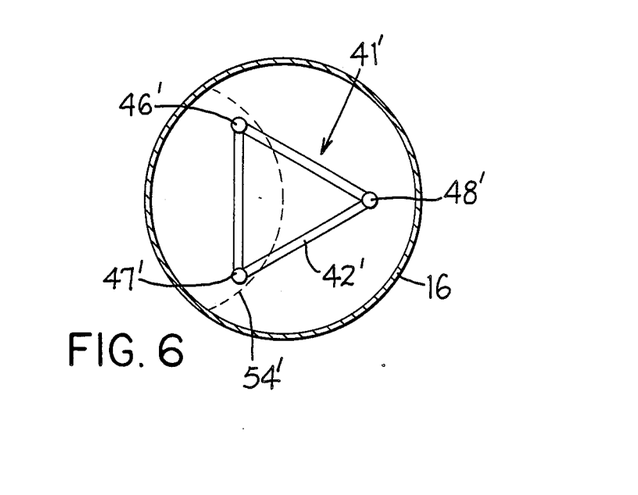
FIGS. 6 and 7 are views like FIG. 5 but illustrate variations of the bubbling arrangement.

Reference is made to FIG. 6 which illustrates a variation employing a bubbling means 41' having a manifold 42' containing only three nozzles disposed within the bottom of the tank. In this proposed variation, the two nozzles 46' and 47' are of small orifice size so as to generate small bubble streams, and the remaining third nozzle 48' is of large orifice size so as to create a stream of larger bubbles. With this arrangement, it has been experimentally observed that the oil particles which rise to the surface of the coolant still tend to collect within a concentrated area such as within the small area defined within the dotted line 54'.

Figure 7:
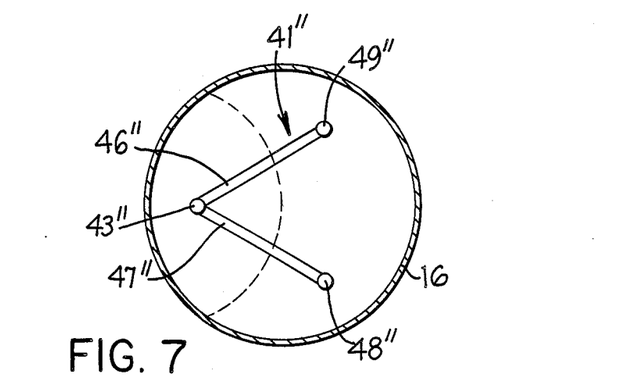

A further variation is illustrated in FIG. 7. This variation of the bubbling arrangement 41'' has the manifold in effect defined by an air supply means 43'' and two small-sized orifice members 46'' and 47''. These small-sized orifices members 46'' and 47'' in effect comprise horizontally-elongate tubular elements which are constructed of a porous material so that, instead of admitting bubbles only within a very small or concentrated area, they emit very small bubbles over an elongate path defined by the length of the orifice member. These sleeve-like orifice members also function as manifolds for supplying pressurized air to large-sized nozzle members 48'' and 49'' which are located closely adjacent the ends of the nozzle sleeves 46'' and 47''. With this arrangement, the nozzle sleeves 46'' and 47'' emit upward streams of small bubbles, and the nozzle members 48'' and 49'' emit upward streams of large bubbles. The operation is basically the same as previously described in that the oil particles rapidly rise to the surface of the coolant and tend to collect within a small surface area, such as an area which is located more closely over the small bubble streams, such as an area within the dotted line 54''.

In actual testing of this separation method, including an arrangement similar to that illustrated by FIG. 6, the nozzle members 46' and 47' were of 10 micron orifice size, and the large nozzle member 48' was of 40 micron orifice size. Thus, the large bubbles are of a size approximately four times larger than the size of the small bubbles.

Further, for optimum operation and effective collection of the oil particles within a small portion of the surface area, it is believed that the size of the large bubbles should be at least several times larger than the size of the small bubbles.

With this method and apparatus, it is believed, based on initial test observations, that the oil particles which rise to the surface of the coolant can be effectively concentrated within a collection area which is no more than, and normally less than, about 30 percent of the overall coolant surface area.

While the embodiments described above all utilize an overall nozzle arrangement employing three or more separate nozzle members, it is believed that the method and apparatus of the present invention is equally suitable for use and performance employing only two nozzles, one for emitting a stream of small bubbles, the other for emitting a stream of larger bubbles. While such arrangement may require selection of a tank having a suitable cross section coupled with selection of a proper ratio between the orifice sizes of the nozzles in order to permit most efficient performance of the present invention, nevertheless such is deemed to be clearly feasible.

The improved process and apparatus as described above relates to removal of dirty coolant directly from the machine sump, cleaning thereof, and then return of the coolant to the machine tool sump. It will be appreciated, however, that the dirty coolant could obviously be stored at any location in any desired fashion, such as in an auxiliary storage tank which may be located either close to or remote from the machine tool, with the improved method and apparatus of this invention being utilized for cleaning the dirty coolant stored in this auxiliary storage tank. Further, the cleaned coolant could obviously be returned to a different storage tank if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for recycling and cleaning a coolant utilized in conjunction with a machine tool to effect removal of tramp oil from the coolant, said apparatus comprising:
   a frame;
   tank means stationarily supported on said frame and defining there a recycling chamber adapted for holding a batch of dirty coolant, said chamber having substantially vertical height and substantially uniform horizontal cross section throughout this height,
   means communicating with the lower portion of said chamber to effect removal of coolant therefrom;
   first nozzle means stationarily mounted adjacent the bottom of said chamber for discharging directly into the dirty coolant a first airstream which creates a first upwardly directed stream of air bubbles;
   second nozzle means stationarily disposed adjacent the bottom of said tank in sidewardly disposed relationship from said first nozzle means for discharging therefrom directly into said dirty coolant a second airstream which creates a second upwardly directed stream of air bubbles of a larger size than said air bubbles of said first stream;
   wherein said first and second nozzle means are constructed and arranged such that the first and second bubble streams agitate the dirty coolant and cause upward movement of oil particles so that said tramp oil tends to collect on the surface of the dirty coolant within a collection area disposed over said first stream of air bubbles;
   said collection area being of a smaller cross sectional area than said chamber horizontal cross section.

2. An apparatus according to claim 1, wherein said first and second nozzle means define respective first and second orifices which are of different size so that the size of the bubbles created by said second nozzle means are larger than the size of the bubbles created by said first nozzle means.

3. An apparatus according to claim 1, wherein said first and second nozzle means jointly define at least three nozzle members which are stationarily disposed adjacent the bottom of said tank in sidewardly disposed relationship relative to one another, said at least three nozzle members being disposed substantially within a horizontal pattern to create a plurality of upwardly-directed bubble streams which effectively cause agitation of the dirty coolant within the recycling chamber throughout substantially the entire horizontal cross section thereof.

4. An apparatus according to claim 1, including pump means mounted on said frame and connected to first conduit means for supplying the coolant into the recycling chamber, filter means stationarily mounted on said tank for permitting passage of the dirty coolant therethrough for removing solid contaminants from the dirty coolant prior to supplying the coolant to the recycling chamber, and second conduit means connected between said pump means and the bottom of said chamber for permitting withdrawal of clean coolant from said chamber.

5. An apparatus according to claim 1, including pump means mounted on said frame and connected to first conduit means for supplying said dirty coolant into said recycling chamber, filter means stationarily mounted on said tank means adjacent the upper end of said chamber for removing solid contaminants from said dirty coolant, said first conduit means discharging said dirty coolant into said filter means, said filter means permitting said dirty coolant to flow therethrough by gravity into said chamber, and second conduit means connected between said pump means and the bottom of said chamber for permitting withdrawal of clean coolant from said chamber.

6. An apparatus according to claim 5, wherein said frame has wheel means mounted thereon and disposed for rolling engagement with the ground to permit said apparatus to be readily moved about.

7. An apparatus according to claim 6, including a first auxiliary tank mounted on said frame for containing a quantity of clean coolant concentrate therein, and a second auxiliary tank mounted on said frame for permitting storage therein of said tramp oil which is removed from said collection area.

8. An apparatus according to claim 6, wherein said first and second nozzle means jointly define at least three nozzle members which are stationarily disposed adjacent the bottom of said tank means in sidewardly disposed relationship relative to one another, said at least three nozzle members being disposed substantially in a horizontal pattern to create a plurality of upwardly-directed bubble streams which effectively cause agitation of the dirty coolant within the recycling chamber throughout substantially the entire horizontal cross section thereof.

9. An apparatus according to claim 1, wherein said first nozzle means comprises horizontally-elongate tubular members constructed of a porous material.

10. A method of cleaning machine tool coolant to effect separation and removal of contaminating oil, comprising the steps of:
  providing a batch of coolant contaminated by oil particles mixed therein;
  depositing said batch of coolant into a recycling chamber having substantially vertical height and substantially uniform horizontal cross section throughout this height;
  injecting a first airstream into the chamber adjacent the bottom thereof to create a first stream of air bubbles which move vertically upwardly through the coolant to the surface thereof so as to effect agitation of the coolant and upward separation of the oil particles;
  injecting a second airstream into said chamber adjacent the bottom thereof and in sidewardly spaced relationship from said first airstream to create a second stream of air bubbles of a larger size than said air bubbles of said first stream which move vertically upwardly through the coolant toward the surface thereof and for causing the oil particles which collect on the surface to concentrate within a collection area on the surface which is disposed over the first stream of bubbles and is smaller than the area of said chamber horizontal cross section;
  removing the oil which collects in said collection area; and
  thereafter removing the cleaned coolant from said recycling chamber.

11. A method according to claim 10, including the step of initially filtering the dirty coolant to remove solid contaminants therefrom prior to supply the dirty coolant into the recycling chamber.

12. A method according to claim 11, including the steps of providing a filter adjacent the top of said chamber, initially supplying the batch of coolant into said filter, and then permitting the coolant to flow downwardly by gravity through said filter into said chamber so that said filter is effective for removing solid contaminants.

13. A method according to claim 11 including the step of initially pumping the coolant directly from a machine tool sump into said recycling chamber and, after removal of the oil which collects in the surface region, thereafter pumping the cleaned coolant from the chamber directly back to the machine tool sump.

14. A method according to claim 10, including the step of injecting a plurality of said first airstreams into the bottom of said chamber in horizontally spaced relationship from one another and from said second airstream to create a plurality of said first airstreams of smaller bubbles which flow vertically upwardly through the coolant.

15. A method according to claim 10, including the step of injecting a plurality of said second air streams into the bottom of said chamber in horizontally spaced relationship from one another and from said first air stream to create a plurality of said second streams of larger bubbles which flow vertically upwardly through said coolant.

16. A method according to claim 10, wherein said second size of said bubbles of said second stream is about four times larger than said first size of said bubbles of said first stream.

17. An apparatus for recycling and cleaning a coolant utilized in conjunction with a machine tool to effect removal of tramp oil from the coolant, said apparatus comprising:
  a frame;
  tank means stationarily supported on said frame and defining therein a recycling chamber containing a batch of dirty coolant, said chamber having substantially vertical height and substantially uniform horizontal cross section throughout this height, first and second nozzle means jointly defining at least three nozzle members which are stationarily disposed adjacent the bottom of said tank means in sidewardly disposed relationship relative to one another, said at least three nozzle members being disposed substantially in a horizontal pattern to create a plurality of upwardly directed bubble streams which effectively cause agitation of the dirty coolant within the recycling chamber throughout substantially the entire cross section thereof; and
  filter means stationarily mounted on said tank means adjacent the upper end of said chamber for removing solid contaminants from said dirty coolant, said filter means permitting said dirty coolant to flow therethrough by gravity into said chamber;
  wherein said first and second nozzle means are constructed and arranged such that said first nozzle means discharges directly into the dirty coolant a first airstream which creates a first upwardly directed stream of air bubbles, said second nozzle means discharges directly into the dirty coolant a second airstream which creates a second upwardly directed stream of air bubbles of a larger size than said air bubbles of said first stream and the bubble streams agitate the dirty coolant and cause upward movement of oil particles so that said tramp oil tends to collect on the surface of the dirty coolant within a collection area disposed over said first stream of air bubbles;
  said collection area being of a smaller cross sectional area than said chamber horizontal cross section.

18. An apparatus according to claim 17, wherein said first nozzle means comprises horizontally-elongate tubular members constructed of a porous material.

* * * * *

UNITED STATES PATENT AND TRADEMARK OFFICE
CERTIFICATE OF CORRECTION

PATENT NO. : 4 872 997

DATED : October 10, 1989

INVENTOR(S) : COOLANT RECYCLING SYSTEM AND METHOD

It is certified that error appears in the above-identified patent and that said Letters Patent is hereby corrected as shown below:

Column 9, line 33; change "supply" to ---supplying---.

Signed and Sealed this

Eighteenth Day of December, 1990

*Attest:*

HARRY F. MANBECK, JR.

*Attesting Officer*  *Commissioner of Patents and Trademarks*